US008270914B2

(12) United States Patent
Pascolini et al.

(10) Patent No.: US 8,270,914 B2
(45) Date of Patent: Sep. 18, 2012

(54) BEZEL GAP ANTENNAS

(75) Inventors: Mattia Pascolini, Campbell, CA (US); Robert J. Hill, Salinas, CA (US); Juan Zavala, Watsonville, CA (US); Nanbo Jin, Sunnyvale, CA (US); Qingxiang Li, Mountain View, CA (US); Robert W. Schlub, Campbell, CA (US); Ruben Caballero, San Jose, CA (US)

(73) Assignee: Apple Inc., Cupertino, CA (US)

(*) Notice: Subject to any disclaimer, the term of this patent is extended or adjusted under 35 U.S.C. 154(b) by 315 days.

(21) Appl. No.: 12/630,756

(22) Filed: Dec. 3, 2009

(65) Prior Publication Data

US 2011/0136447 A1 Jun. 9, 2011

(51) Int. Cl.
*H04B 1/38* (2006.01)

(52) U.S. Cl. ................... 455/90.2; 455/575.7; 455/90.3; 455/107; 455/552.1; 455/562.1; 343/702

(58) Field of Classification Search ................. 455/90.2, 455/575.7, 90.3, 107, 552.1, 562.1; 379/90, 379/428; 343/702
See application file for complete search history.

(56) References Cited

U.S. PATENT DOCUMENTS 2,942,263 A 6/1960 Baldwin
3,394,373 A 7/1968 Makrancy
4,879,755 A * 11/1989 Stolarczyk et al. ............ 725/41
4,894,663 A 1/1990 Urbish
4,980,694 A 12/1990 Hines
5,021,010 A 6/1991 Wright
5,041,838 A 8/1991 Liimatainen
5,048,118 A 9/1991 Brooks
5,061,943 A 10/1991 Rammos
5,381,387 A * 1/1995 Blonder et al. ................. 368/10
5,408,241 A 4/1995 Shattuck
5,473,252 A * 12/1995 Renz et al. .................... 324/318
5,561,437 A 10/1996 Phillips
5,754,143 A 5/1998 Warnagiris (Continued)

FOREIGN PATENT DOCUMENTS

EP 1 286 413 2/2003

(Continued)

OTHER PUBLICATIONS

U.S. Appl. No. 11/821,192, filed Jun. 21, 2007, Hill et al.

(Continued)

*Primary Examiner* — Sanh Phu
(74) *Attorney, Agent, or Firm* — Treyz Law Group; G. Victor Treyz; David C. Kellogg

(57) ABSTRACT

Electronic devices are provided that contain wireless communications circuitry. The wireless communications circuitry may include radio-frequency transceiver circuitry and antenna structures. A parallel-fed loop antenna may be formed from portions of an electronic device bezel and a ground plane. The antenna may operate in multiple communications bands. An impedance matching circuit for the antenna may be formed from a parallel-connected inductive element and a series-connected capacitive element. The bezel may surround a peripheral portion of a display that is mounted to the front of an electronic device. The bezel may contain a gap. Antenna feed terminals for the antenna may be located on opposing sides of the gap. The inductive element may bridge the gap and the antenna feed terminals. The capacitive element may be connected in series between one of the antenna feed terminals and a conductor in a transmission line located between the transceiver circuitry and the antenna.

23 Claims, 11 Drawing Sheets

U.S. PATENT DOCUMENTS

| | | | | |
|---|---|---|---|---|
| 5,798,984 | A | 8/1998 | Koch | |
| 6,011,699 | A | 1/2000 | Murray | |
| 6,097,345 | A | 8/2000 | Walton | |
| 6,282,433 | B1 | 8/2001 | Holshouser | |
| 6,337,662 | B1 | 1/2002 | Cassel | |
| 6,622,031 | B1 | 9/2003 | McCleary | |
| 6,670,923 | B1 | 12/2003 | Kadambi et al. | |
| 6,741,214 | B1 | 5/2004 | Kadambi et al. | |
| 6,747,601 | B2 | 6/2004 | Boyle | |
| 6,762,723 | B2 | 7/2004 | Nallo | |
| 6,853,605 | B2 | 2/2005 | Fujisawa et al. | |
| 6,856,294 | B2 | 2/2005 | Kadambi et al. | |
| 6,968,508 | B2 | 11/2005 | Lucaci | |
| 6,980,154 | B2 | 12/2005 | Vance et al. | |
| 7,027,838 | B2 | 4/2006 | Zhou et al. | |
| 7,116,267 | B2 | 10/2006 | Schuster et al. | |
| 7,119,747 | B2 | 10/2006 | Lin et al. | |
| 7,123,208 | B2 | 10/2006 | Baliarda et al. | |
| 7,215,600 | B1 | 5/2007 | DeRosa | |
| 7,714,790 | B1 * | 5/2010 | Feldstein et al. | 343/702 |
| 2002/0126236 | A1 | 9/2002 | Hiratsuka | |
| 2003/0107518 | A1 | 6/2003 | Li et al. | |
| 2004/0017318 | A1 | 1/2004 | Annabi | |
| 2004/0090377 | A1 | 5/2004 | Dai et al. | |
| 2004/0145521 | A1 | 7/2004 | Hebron et al. | |
| 2004/0257283 | A1 | 12/2004 | Asano et al. | |
| 2006/0055606 | A1 | 3/2006 | Boyle | |
| 2006/0097941 | A1 | 5/2006 | Bettner et al. | |
| 2006/0125703 | A1 | 6/2006 | Ma et al. | |
| 2007/0176843 | A1 | 8/2007 | Qureshi | |
| 2007/0182658 | A1 | 8/2007 | Ozden | |
| 2008/0143613 | A1 | 6/2008 | Iwai et al. | |
| 2009/0153407 | A1 | 6/2009 | Zhang et al. | |
| 2009/0256758 | A1 * | 10/2009 | Schlub et al. | 343/702 |
| 2011/0006953 | A1 * | 1/2011 | Chiang et al. | 343/702 |

FOREIGN PATENT DOCUMENTS

| | | |
|---|---|---|
| EP | 1 315 238 | 5/2003 |
| EP | 1 401 050 | 3/2004 |
| WO | 02/078123 | 10/2002 |
| WO | 2004/001894 | 12/2003 |
| WO | WO 2005/032130 | 4/2005 |
| WO | 2005/109567 | 11/2005 |
| WO | 2006/114771 | 11/2006 |
| WO | 2007/039668 | 4/2007 |

OTHER PUBLICATIONS

U.S. Appl. No. 11/895,053, filed Aug. 22, 2007, Zhang et al.
U.S. Appl. No. 11/956,314, filed Dec. 13, 2007, Zhang et al.
U.S. Appl. No. 12/274,311, filed Nov. 19, 2008, Hill et al.
U.S. Appl. No. 60/833,587, filed Jan. 5, 2007, Hobson et al.
U.S. Appl. No. 11/650,071, filed Jan. 4, 2007, Schlub et al.

* cited by examiner

BEZEL GAP ANTENNAS

BACKGROUND

This relates generally to wireless communications circuitry, and more particularly, to electronic devices that have wireless communications circuitry.

Electronic devices such as handheld electronic devices are becoming increasingly popular. Examples of handheld devices include handheld computers, cellular telephones, media players, and hybrid devices that include the functionality of multiple devices of this type.

Devices such as these are often provided with wireless communications capabilities. For example, electronic devices may use long-range wireless communications circuitry such as cellular telephone circuitry to communicate using cellular telephone bands at 850 MHz, 900 MHz, 1800 MHz, and 1900 MHz (e.g., the main Global System for Mobile Communications or GSM cellular telephone bands). Long-range wireless communications circuitry may also handle the 2100 MHz band. Electronic devices may use short-range wireless communications links to handle communications with nearby equipment. For example, electronic devices may communicate using the WiFi® (IEEE 802.11) bands at 2.4 GHz and 5 GHz and the Bluetooth® band at 2.4 GHz.

To satisfy consumer demand for small form factor wireless devices, manufacturers are continually striving to implement wireless communications circuitry such as antenna components using compact structures. At the same time, it may be desirable to include conductive structures in an electronic device such as metal device housing components. Because conductive components can affect radio-frequency performance, care must be taken when incorporating antennas into an electronic device that includes conductive structures.

It would therefore be desirable to be able to provide improved wireless communications circuitry for wireless electronic devices.

SUMMARY

Electronic devices may be provided that include antenna structures. An antenna may be configured to operate in first and second communications bands. An electronic device may contain radio-frequency transceiver circuitry that is coupled to the antenna using a transmission line. The transmission line may have a positive conductor and a ground conductor. The antenna may have a positive antenna feed terminal and a ground antenna feed terminal to which the positive and ground conductors of the transmission line are respectively coupled.

The electronic device may have a rectangular periphery. A rectangular display may be mounted on a front face of the electronic device. The electronic device may have a rear face that is formed form a plastic housing member. Conductive sidewall structures may run around the periphery of the electronic device housing and display. The conductive sidewall structures may serve as a bezel for the display.

The bezel may include at least one gap. The gap may be filled with a solid dielectric such as plastic. The antenna may be formed from the portion of the bezel that includes the gap and a portion of a ground plane. To avoid excessive sensitivity to touch events, the antenna may be fed using a feed arrangement that reduces electric field concentration in the vicinity of the gap. An impedance matching network may be formed that provides satisfactory operation in both the first and second bands.

The impedance matching network may include an inductive element that is formed in parallel with the antenna feed terminals and a capacitive element that is formed in series with one of the antenna feed terminals. The inductive element may be formed from a transmission line inductive structure that bridges the antenna feed terminals. The capacitive element may be formed from a capacitor that is interposed in the positive feed path for the antenna. The capacitor may, for example, be connected between the positive ground conductor of the transmission line and the positive antenna feed terminal.

Further features of the invention, its nature and various advantages will be more apparent from the accompanying drawings and the following detailed description of the preferred embodiments.

DETAILED DESCRIPTION

Electronic devices may be provided with wireless communications circuitry. The wireless communications circuitry may be used to support wireless communications in multiple wireless communications bands. The wireless communications circuitry may include one or more antennas.

The antennas can include loop antennas. Conductive structures for a loop antenna may, if desired, be formed from conductive electronic device structures. The conductive electronic device structures may include conductive housing structures. The housing structures may include a conductive bezel. Gap structures may be formed in the conductive bezel. The antenna may be parallel-fed using a configuration that helps to minimize sensitivity of the antenna to contact with a user's hand or other external object.

Any suitable electronic devices may be provided with wireless circuitry that includes loop antenna structures. As an example, loop antenna structures may be used in electronic devices such as desktop computers, game consoles, routers, laptop computers, etc. With one suitable configuration, loop antenna structures are provided in relatively compact electronic devices in which interior space is relatively valuable such as portable electronic devices.

Figure 1:
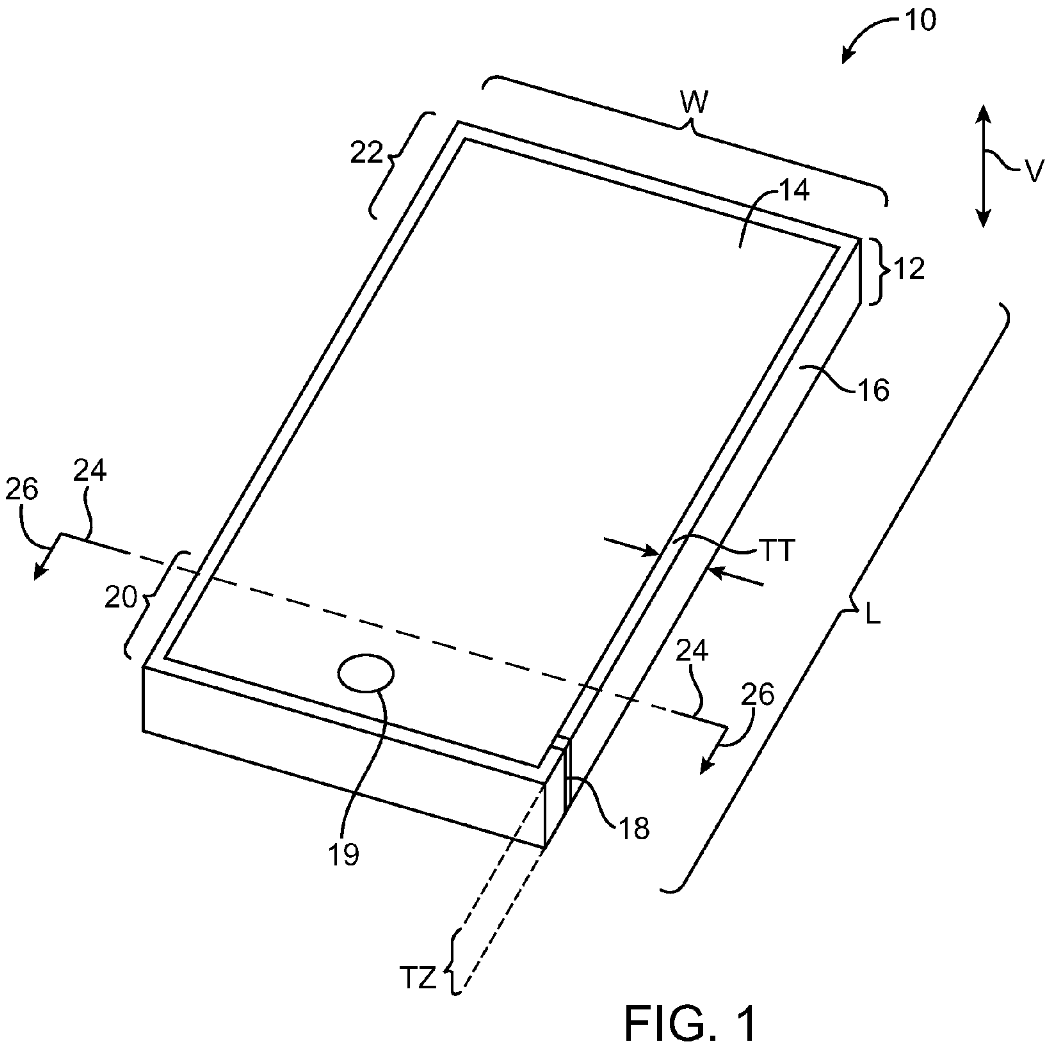
FIG. 1 is a perspective view of an illustrative electronic device with wireless communications circuitry in accordance with an embodiment of the present invention.

An illustrative portable electronic device in accordance with an embodiment of the present invention is shown in FIG. 1. Portable electronic devices such as illustrative portable electronic device 10 may be laptop computers or small portable computers such as ultraportable computers, netbook computers, and tablet computers. Portable electronic devices may also be somewhat smaller devices. Examples of smaller portable electronic devices include wrist-watch devices, pendant devices, headphone and earpiece devices, and other wearable and miniature devices. With one suitable arrangement, the portable electronic devices are handheld electronic devices such as cellular telephones.

Space is at a premium in portable electronic devices. Conductive structures are also typically present, which can make efficient antenna operation challenging. For example, conductive housing structures may be present around some or all of the periphery of a portable electronic device housing.

In portable electronic device housing arrangements such as these, it may be particularly advantageous to use loop-type antenna designs that cover communications bands of interest. The use of portable devices such as handheld devices is therefore sometimes described herein as an example, although any suitable electronic device may be provided with loop antenna structures, if desired.

Handheld devices may be, for example, cellular telephones, media players with wireless communications capabilities, handheld computers (also sometimes called personal digital assistants), remote controllers, global positioning system (GPS) devices, and handheld gaming devices. Handheld devices and other portable devices may, if desired, include the functionality of multiple conventional devices. Examples of multi-functional devices include cellular telephones that include media player functionality, gaming devices that include wireless communications capabilities, cellular telephones that include game and email functions, and handheld devices that receive email, support mobile telephone calls, and support web browsing. These are merely illustrative examples. Device 10 of FIG. 1 may be any suitable portable or handheld electronic device.

Device 10 includes housing 12 and includes at least one antenna for handling wireless communications. Housing 12, which is sometimes referred to as a case, may be formed of any suitable materials including, plastic, glass, ceramics, composites, metal, or other suitable materials, or a combination of these materials. In some situations, parts of housing 12 may be formed from dielectric or other low-conductivity material, so that the operation of conductive antenna elements that are located within housing 12 is not disrupted. In other situations, housing 12 may be formed from metal elements.

Device 10 may, if desired, have a display such as display 14. Display 14 may, for example, be a touch screen that incorporates capacitive touch electrodes. Display 14 may include image pixels formed form light-emitting diodes (LEDs), organic LEDs (OLEDs), plasma cells, electronic ink elements, liquid crystal display (LCD) components, or other suitable image pixel structures. A cover glass member may cover the surface of display 14. Buttons such as button 19 may pass through openings in the cover glass.

Housing 12 may include sidewall structures such as sidewall structures 16. Structures 16 may be implemented using conductive materials. For example, structures 16 may be implemented using a conductive ring member that substantially surrounds the rectangular periphery of display 14. Structures 16 may be formed from a metal such as stainless steel, aluminum, or other suitable materials. One, two, or more than two separate structures may be used in forming structures 16. Structures 16 may serve as a bezel that holds display 14 to the front (top) face of device 10. Structures 16 are therefore sometimes referred to herein as bezel structures 16 or bezel 16. Bezel 16 runs around the rectangular periphery of device 10 and display 14.

Bezel 16 may have a thickness (dimension TT) of about 0.1 mm to 3 mm (as an example). The sidewall portions of bezel 16 may be substantially vertical (parallel to vertical axis V). Parallel to axis V, bezel 16 may have a dimension TZ of about 1 mm to 2 cm (as an example). The aspect ratio R of bezel 16 (i.e., the of TZ to TT) is typically more than 1 (i.e., R may be greater than or equal to 1, greater than or equal to 2, greater than or equal to 4, greater than or equal to 10, etc.).

It is not necessary for bezel 16 to have a uniform cross-section. For example, the top portion of bezel 16 may, if desired, have an inwardly protruding lip that helps hold display 14 in place. If desired, the bottom portion of bezel 16 may also have an enlarged lip (e.g., in the plane of the rear surface of device 10). In the example of FIG. 1, bezel 16 has substantially straight vertical sidewalls. This is merely illustrative. The sidewalls of bezel 16 may be curved or may have any other suitable shape.

Display 14 includes conductive structures such as an array of capacitive electrodes, conductive lines for addressing pixel elements, driver circuits, etc. These conductive structures tend to block radio-frequency signals. It may therefore be desirable to form some or all of the rear planar surface of device from a dielectric material such as plastic.

Portions of bezel 16 may be provided with gap structures. For example, bezel 16 may be provided with one or more gaps such as gap 18, as shown in FIG. 1. Gap 18 lies along the periphery of the housing of device 10 and display 12 and is therefore sometimes referred to as a peripheral gap. Gap 18 divides bezel 16 (i.e., there is generally no conductive portion of bezel 16 in gap 18).

As shown in FIG. 1, gap 18 may be filled with dielectric. For example, gap 18 may be filled with air. To help provide device 10 with a smooth uninterrupted appearance and to ensure that bezel 16 is aesthetically appealing, gap 18 may be filled with a solid (non-air) dielectric such as plastic. Bezel 16 and gaps such as gap (and its associated plastic filler structure) may form part of one or more antennas in device 10. For example, portions of bezel 16 and gaps such as gap 18 may, in conjunction with internal conductive structures, form one or more loop antennas. The internal conductive structures may include printed circuit board structures, frame members or other support structures, or other suitable conductive structures.

In a typical scenario, device 10 may have upper and lower antennas (as an example). An upper antenna may, for example, be formed at the upper end of device 10 in region 22. A lower antenna may, for example, be formed at the lower end of device 10 in region 20.

The lower antenna may, for example, be formed partly from the portions of bezel 16 in the vicinity of gap 18.

Antennas in device 10 may be used to support any communications bands of interest. For example, device 10 may include antenna structures for supporting local area network communications, voice and data cellular telephone communications, global positioning system (GPS) communications, Bluetooth® communications, etc. As an example, the lower antenna in region 20 of device 10 may be used in handling voice and data communications in one or more cellular telephone bands.

Figure 2:
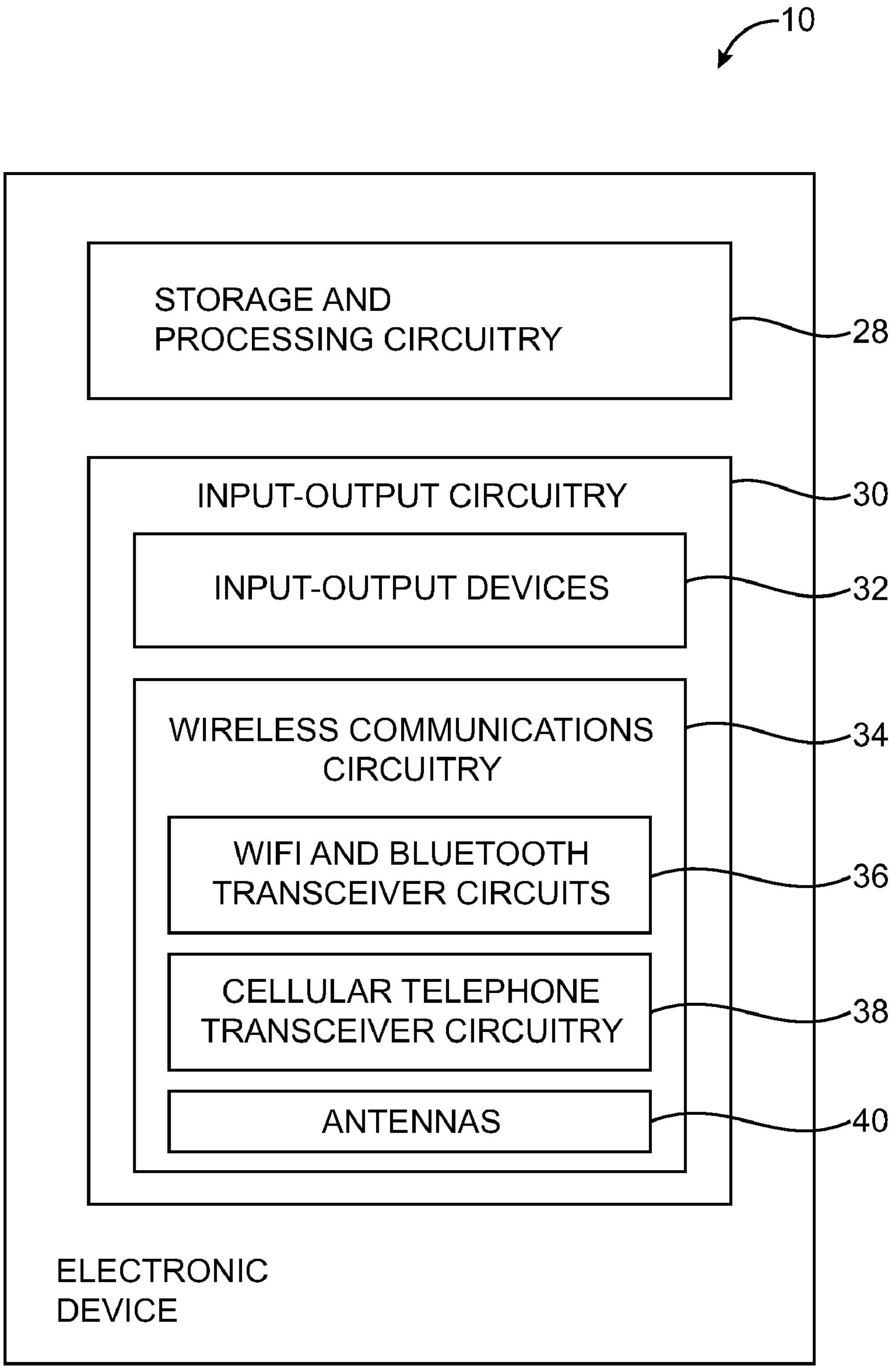
FIG. 2 is a schematic diagram of an illustrative electronic device with wireless communications circuitry in accordance with an embodiment of the present invention.

A schematic diagram of an illustrative electronic device is shown in FIG. 2. Device 10 of FIG. 2 may be a portable computer such as a portable tablet computer, a mobile telephone, a mobile telephone with media player capabilities, a handheld computer, a remote control, a game player, a global positioning system (GPS) device, a combination of such devices, or any other suitable portable electronic device.

As shown in FIG. 2, handheld device 10 may include storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, applications specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, etc.

Input-output circuitry 30 may be used to allow data to be supplied to device 10 and to allow data to be provided from device 10 to external devices. Input-output devices 32 such as touch screens and other user input interface are examples of input-output circuitry 32. Input-output devices 32 may also include user input-output devices such as buttons, joysticks, click wheels, scrolling wheels, touch pads, key pads, keyboards, microphones, cameras, etc. A user can control the operation of device 10 by supplying commands through such user input devices. Display and audio devices such as display 14 (FIG. 1) and other components that present visual information and status data may be included in devices 32. Display and audio components in input-output devices 32 may also include audio equipment such as speakers and other devices for creating sound. If desired, input-output devices 32 may contain audio-video interface equipment such as jacks and other connectors for external headphones and monitors.

Wireless communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications). Wireless communications circuitry 34 may include radio-frequency transceiver circuits for handling multiple radio-frequency communications bands. For example, circuitry 34 may include transceiver circuitry 36 and 38. Transceiver circuitry 36 may handle 2.4 GHz and 5 GHz bands for WiFi® (IEEE 802.11) communications and may handle the 2.4 GHz Bluetooth® communications band. Circuitry 34 may use cellular telephone transceiver circuitry 38 for handling wireless communications in cellular telephone bands such as the GSM bands at 850 MHz, 900 MHz, 1800 MHz, and 1900 MHz, and the 2100 MHz data band (as examples). Wireless communications circuitry 34 can include circuitry for other short-range and long-range wireless links if desired. For example, wireless communications circuitry 34 may include global positioning system (GPS) receiver equipment, wireless circuitry for receiving radio and television signals, paging circuits, etc. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include antennas 40. Antennas 40 may be formed using any suitable antenna types. For example, antennas 40 may include antennas with resonating elements that are formed from loop antenna structure, patch antenna structures, inverted-F antenna structures, slot antenna structures, planar inverted-F antenna structures, helical antenna structures, hybrids of these designs, etc. Different types of antennas may be used for different bands and combinations of bands. For example, one type of antenna may be used in forming a local wireless link antenna and another type of antenna may be used in forming a remote wireless link.

With one suitable arrangement, which is sometimes described herein as an example, the lower antenna in device 10 (i.e., an antenna 40 located in region 20 of device 10 of FIG. 1) may be formed using a loop-type antenna design. When a user holds device 10, the user's fingers may contact the exterior of device 10. For example, the user may touch device 10 in region 20. To ensure that antenna performance is not overly sensitive to the presence or absence of a user's touch or contact by other external objects, the loop-type antenna may be fed using an arrangement that does not overly concentrate electric fields in the vicinity of gap 18.

Figure 3:
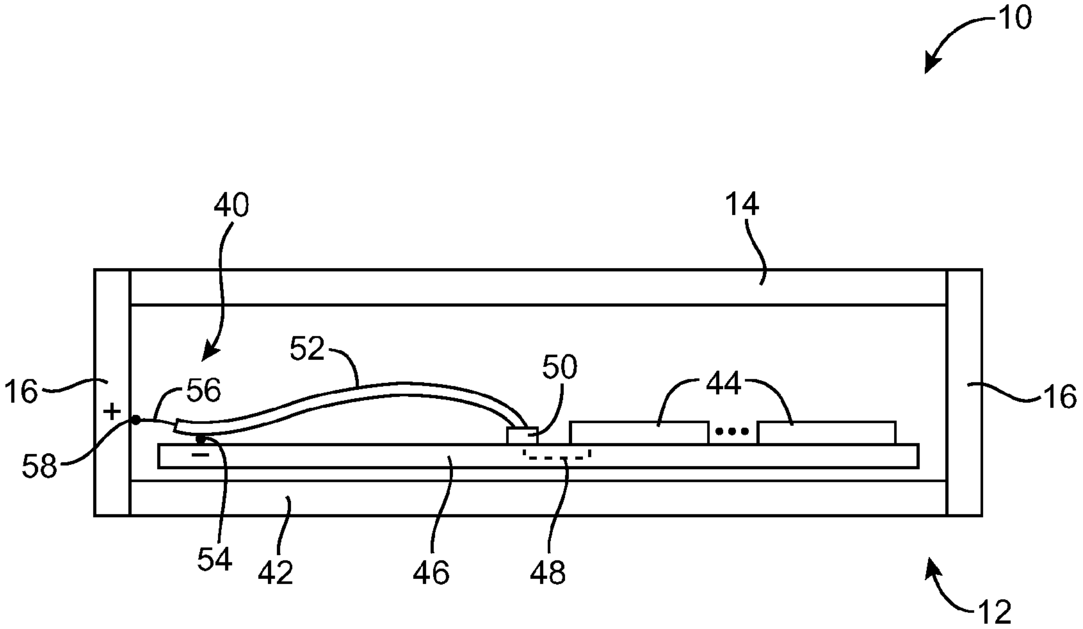
FIG. 3 is a cross-sectional end view of an illustrative electronic device with wireless communications circuitry in accordance with an embodiment of the present invention.

A cross-sectional side view of device 10 of FIG. 1 taken along line 24-24 in FIG. 1 and viewed in direction 26 is shown in FIG. 3. As shown in FIG. 3, display 14 may be mounted to the front surface of device 10 using bezel 16. Housing 12 may include sidewalls formed from bezel 16 and one or more rear walls formed from structures such as planar rear housing structure 42. Structure 42 may be formed from a dielectric such as plastic or other suitable materials. Snaps, clips, screws, adhesive, and other structures may be used in attaching bezel 16 to display 14 and rear housing wall structure 42.

Device 10 may contain printed circuit boards such as printed circuit board 46. Printed circuit board 46 and the other printed circuit boards in device 10 may be formed from rigid printed circuit board material (e.g., fiberglass-filled epoxy) or flexible sheets of material such as polymers. Flexible printed circuit boards ("flex circuits") may, for example, be formed from flexible sheets of polyimide.

Printed circuit board 46 may contain interconnects such as interconnects 48. Interconnects 48 may be formed from conductive traces (e.g., traces of gold-plated copper or other metals). Connectors such as connector 50 may be connected to interconnects 48 using solder or conductive adhesive (as examples). Integrated circuits, discrete components such as resistors, capacitors, and inductors, and other electronic components may be mounted to printed circuit board 46.

Antenna 40 may have antenna feed terminals. For example, antenna 40 may have a positive antenna feed terminal such as positive antenna feed terminal 58 and a ground antenna feed terminal such as ground antenna feed terminal 54. In the illustrative arrangement of FIG. 3, a transmission line path such as coaxial cable 52 may be coupled between the antenna feed formed from terminals 58 and 54 and transceiver circuitry in components 44 via connector 50 and interconnects 48. Components 44 may include one or more integrated circuits that implement the transceiver circuits 36 and 38 of FIG. 2. Connector 50 may be, for example, a coaxial cable connector that is connected to printed circuit board 46. Cable 52 may be a coaxial cable or other transmission line. Terminal 58 may be coupled to coaxial cable center connector 56. Terminal 54 may be connected to a ground conductor in cable 52 (e.g., a conductive outer braid conductor). Other arrangements may be used for coupling transceivers in device 10 to antenna 40 if desired. The arrangement of FIG. 3 is merely illustrative.

As the cross-sectional view of FIG. 3 makes clear, the sidewalls of housing 12 that are formed by bezel 16 may be relatively tall. At the same time, the amount of area that is available to form an antenna in region 20 at the lower end of device 10 may be limited, particularly in a compact device. The compact size that is desired form forming the antenna may make it difficult to form a slot-type antenna shape of sufficient size to resonant in desired communications bands. The shape of bezel 16 may tend to reduce the efficiency of conventional planar inverted-F antennas. Challenges such as these may, if desired, be addressed using a loop-type design for antenna 40.

Figure 4:
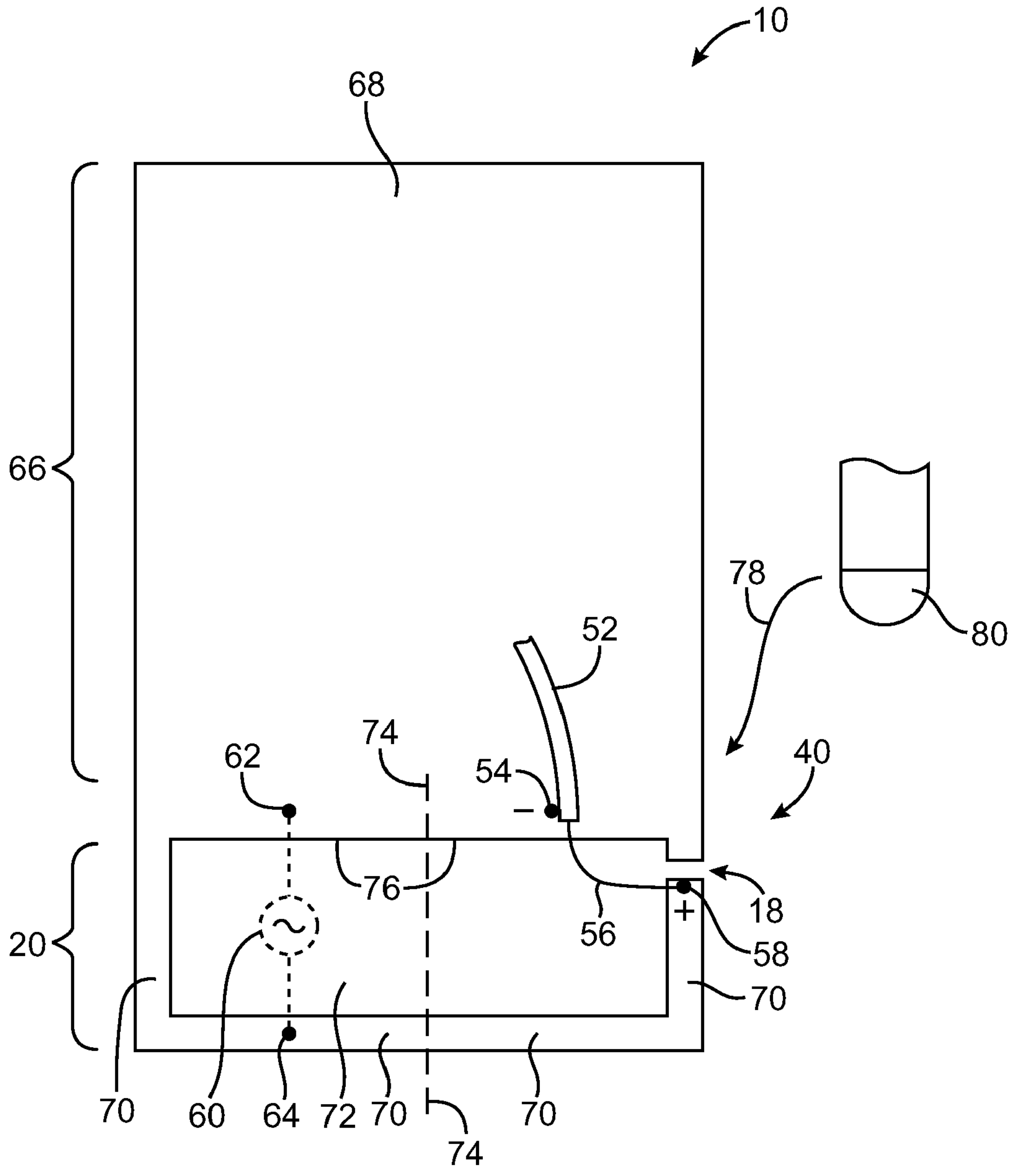
FIG. 4 is a diagram of an illustrative antenna in accordance with an embodiment of the present invention.

Consider, as an example, the antenna arrangement of FIG. 4. As shown in FIG. 4, antenna 40 may be formed in region 20 of device 10. Region 20 may be located at the lower end of device 10, as described in connection with FIG. 1. Conductive region 68, which may sometimes be referred to as a ground plane or ground plane element, may be formed from one or more conductive structures (e.g., planar conductive traces on printed circuit board 46, internal structural members in device 10, electrical components 44 on board 46, radio-frequency shielding cans mounted on board 46, etc.). Conductive region 68 in region 66 is sometimes referred to as forming a "ground region" for antenna 40. Conductive structures 70 of FIG. 4 may be formed by bezel 16. Regions 70 are sometimes referred to as ground plane extensions. Gap 18 may be formed in this conductive bezel portion (as shown in FIG. 1).

Ground plane extensions 70 (i.e., portions of bezel 16) and the portions of region 68 that lie along edge 76 of ground region 68 form a conductive loop around opening 72. Opening 72 may be formed from air, plastics and other solid dielectrics. If desired, the outline of opening 72 may be curved, may have more than four straight segments, and/or may be defined by the outlines of conductive components. The rectangular shape of dielectric region 72 in FIG. 4 is merely illustrative.

The conductive structures of FIG. 4 may, if desired, be fed by coupling radio-frequency transceiver 60 across ground antenna feed terminal 62 and positive antenna feed terminal 64. As shown in FIG. 4, in this type of arrangement, the feed for antenna 40 is not located in the vicinity of gap 18 (i.e., feed terminals 62 and 64 are located to the left of laterally centered dividing line 74 of opening 72, whereas gap 18 is located to the right of dividing line 74 along the right-hand side of device 10). While this type of arrangement may be satisfactory in some situations, antenna feed arrangements that locate the antenna feed terminals at the locations of terminals 62 and 64 of FIG. 4 tend to accentuate the electric field strength of the radio-frequency antenna signals in the vicinity of gap 18. If a user happens to place an external object such as finger 80 into the vicinity of gap 18 by moving finger 80 in direction 78 (e.g., when grasping device 10 in the user's hand), the presence of the user's finger may disrupt the operation of antenna 40.

To ensure that antenna 40 is not overly sensitive to touch (i.e., to desensitize antenna 40 to touch events involving the hand of the user of device 10 and other external objects), antenna 40 may be fed using antenna feed terminals located in the vicinity of gap 18 (e.g., where shown by positive antenna feed terminal 58 and ground antenna feed terminal 54 in the FIG. 4 example). When the antenna feed is located to the right of line 74 and, more particularly, when the antenna feed is located close to gap 18, the electric fields that are produced at gap 18 tend to be reduced. This helps minimize the sensitivity of antenna 40 to the presence of the user's hand, ensuring satisfactory operation regardless of whether or not an external object is in contact with device 10 in the vicinity of gap 18.

Figure 5:
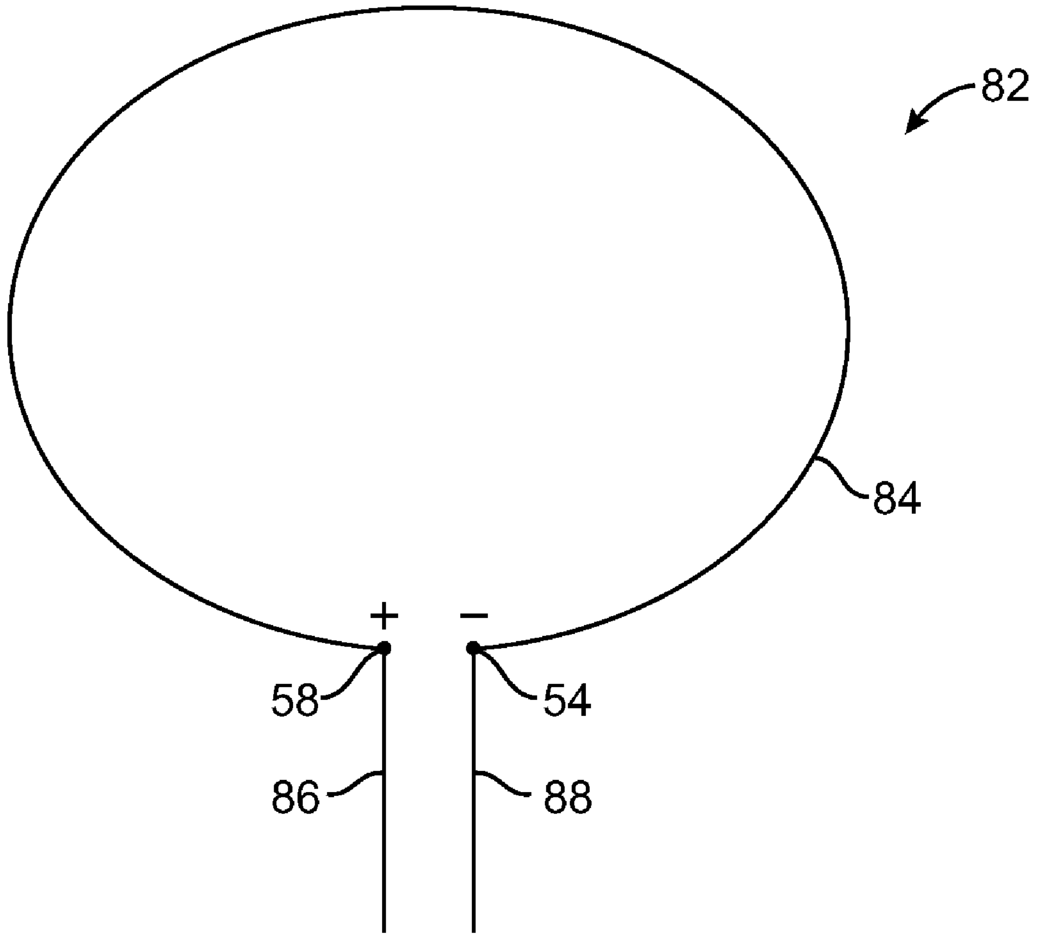
FIG. 5 is a schematic diagram of an illustrative series-fed loop antenna that may be used in an electronic device in accordance with an embodiment of the present invention.

In the arrangement of FIG. 4, antenna 40 is being series fed. A schematic diagram of a series-fed loop antenna of the type shown in FIG. 4 is shown in FIG. 5. As shown in FIG. 5, series-fed loop antenna 82 may have a loop-shaped conductive path such as loop 84. A transmission line composed of positive transmission line conductor 86 and ground transmission line conductor 88 may be coupled to antenna feed terminals 58 and 54, respectively.

It may be challenging to effectively use a series-fed feed arrangement of the type shown in FIG. 5 to feed a multi-band loop antenna. For example, it may be desired to operate a loop antenna in a lower frequency band that covers the GSM sub-bands at 850 MHz and 900 MHz and a higher frequency band that covers the GSM sub-bands at 1800 MH and 1900 MHz and the data sub-band at 2100 MHz. This type of arrangement may be considered to be a dual band arrangement (e.g., 850/900 for the first band and 1800/1900/2100 for the second band) or may be considered to have five bands (850, 900, 1800, 1900, and 2100). In multi-band arrangements such as these, series-fed antennas such as loop antenna 82 of FIG. 5 may exhibit substantially better impedance matching in the high-frequency communications band than in the low-frequency communications band.

Figure 6:
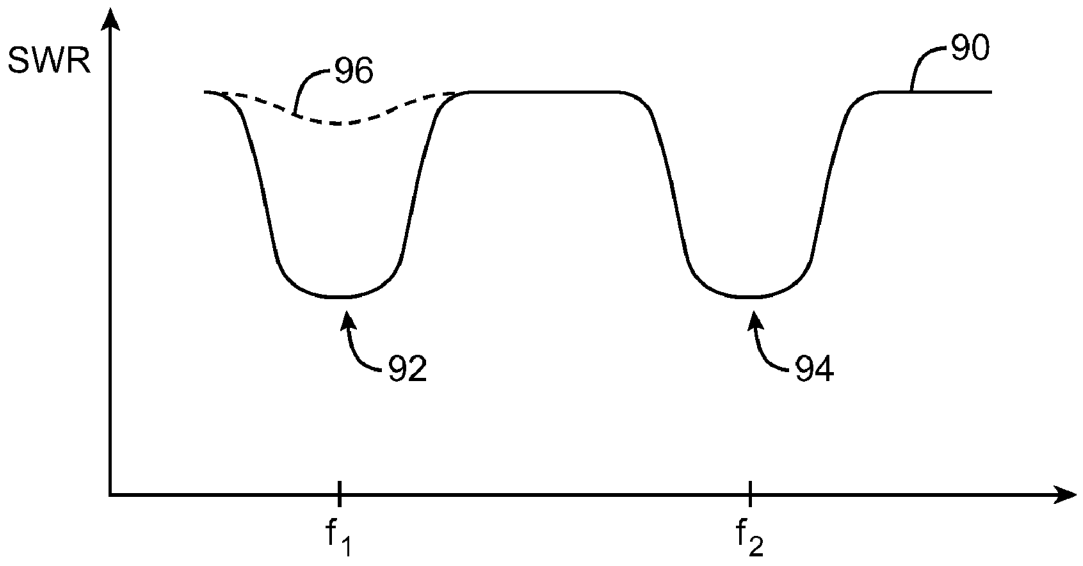
FIG. 6 is a graph showing how an electronic device antenna may be configured to exhibit coverage in multiple communications bands in accordance with an embodiment of the present invention.

A standing-wave-ratio (SWR) versus frequency plot that illustrates this effect is shown in FIG. 6. As shown in FIG. 6, SWR plot 90 may exhibit a satisfactory resonant peak (peak 94) at high-band frequency f2 (e.g., to cover the sub-bands at 1800 MHz, 1900 MHz, and 2100 MHz). SWR plot 90 may, however, exhibit a relatively poor performance in the low-frequency band centered at frequency f1 when antenna 40 is series fed. For example, SWR plot 90 for a series-fed loop antenna 82 of FIG. 5 may be characterized by weak resonant peak 96. As this example demonstrates, series-fed loop antennas may provide satisfactory impedance matching to transmission line 52 (FIG. 3) in a higher frequency band at f2, but may not provide satisfactory impedance matching to transmission line 52 (FIG. 3) in lower frequency band f1.

A more satisfactory level of performance (illustrated by low-band resonant peak 92) may be obtained using a parallel-fed arrangement with appropriate impedance matching features.

Figure 7:
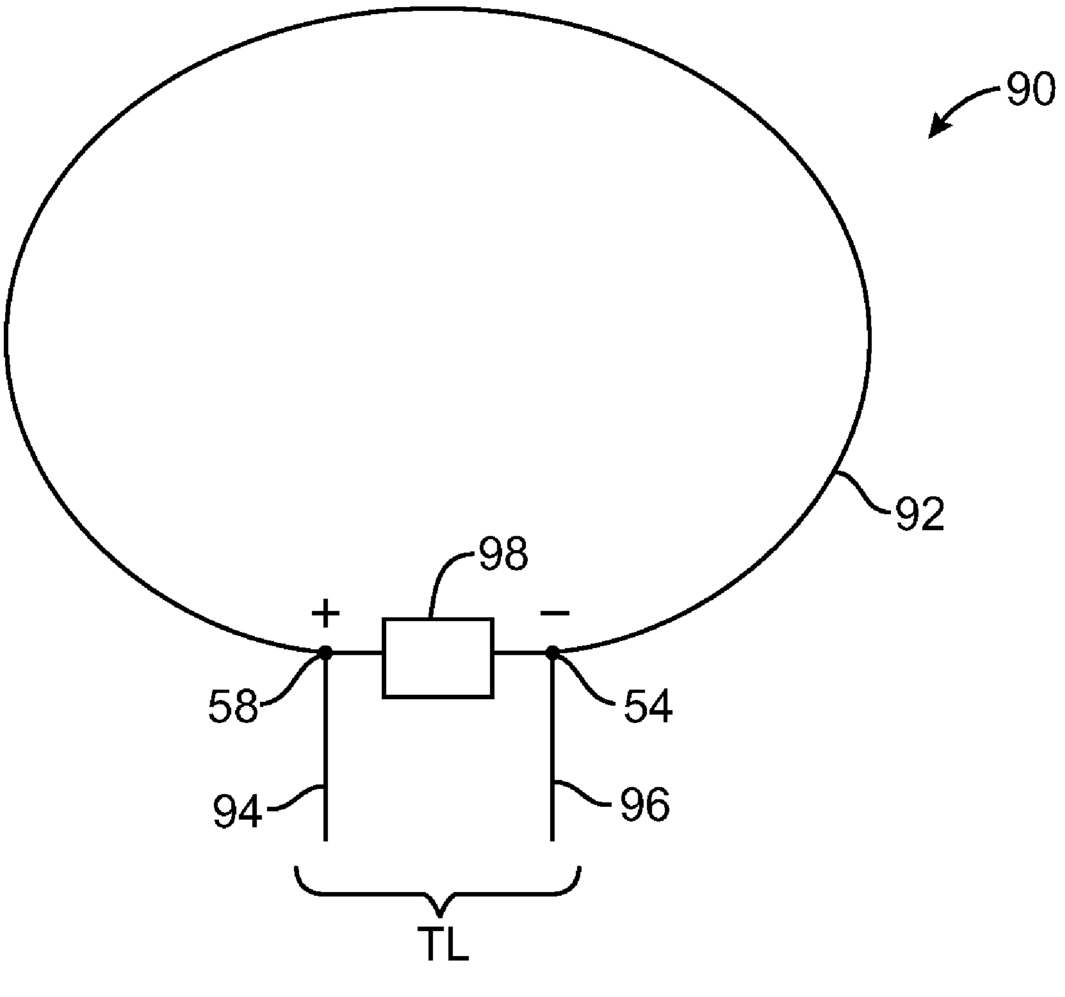
FIG. 7 is a schematic diagram of an illustrative parallel-fed loop antenna that may be used in an electronic device in accordance with an embodiment of the present invention.

An illustrative parallel-fed loop antenna is shown schematically in FIG. 7. As shown in FIG. 7, parallel-fed loop antenna 90 may have a loop of conductor such as loop 92. Loop 92 in the FIG. 7 example is shown as being circular. This is merely illustrative. Loop 92 may have other shapes if desired (e.g., rectangular shapes, shapes with both curved and straight sides, shapes with irregular borders, etc.). Transmission line TL may include positive signal conductor 94 and ground signal conductor 96. Paths 94 and 96 may be contained in coaxial cables, micro-strip transmission lines on flex circuits and rigid printed circuit boards, etc. Transmission line TL may be coupled to the feed of antenna 90 using positive antenna feed terminal 58 and ground antenna feed terminal 54. Electrical element 98 may bridge terminals 58 and 54, thereby "closing" the loop formed by path 92. When the loop is closed in this way, element 98 is interposed in the conductive path that forms loop 92. The impedance of parallel-fed loop antennas such as loop antenna 90 of FIG. 7 may be adjusted by proper selection of the element 98 and, if desired, other circuits (e.g., capacitors or other elements interposed in one of the feed lines such as line 94 or line 96).

Element 98 may be formed from one or more electrical components. Components that may be used as all or part of element 98 include resistors, inductors, and capacitors. Desired resistances, inductances, and capacitances for element 98 may be formed using integrated circuits, using discrete components and/or using dielectric and conductive structures that are not part of a discrete component or an integrated circuit. For example, a resistance can be formed using thin lines of a resistive metal alloy, capacitance can be formed by spacing two conductive pads close to each other that are separated by a dielectric, and an inductance can be formed by creating a conductive path on a printed circuit board. These types of structures may be referred to as resistors, capacitors, and/or inductors or may be referred to as capacitive antenna feed structures, resistive antenna feed structures and/or inductive antenna feed structures.

Figure 8:
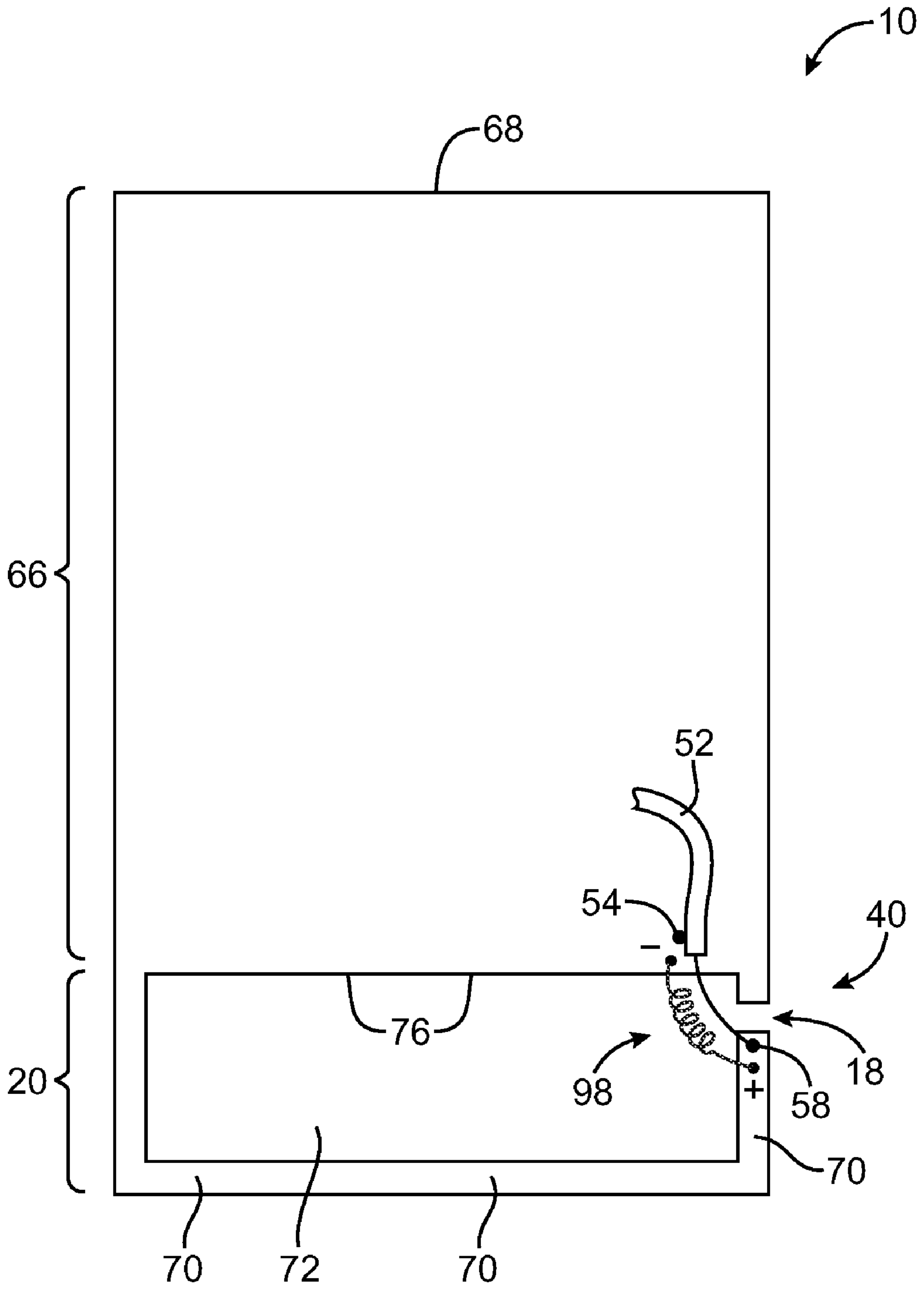
FIG. 8 is a diagram of an illustrative parallel-feed loop antenna with an inductance interposed in the loop in accordance with an embodiment of the present invention.

An illustrative configuration for antenna 40 in which component 98 of the schematic diagram of FIG. 7 has been implemented using an inductor is shown in FIG. 8. As shown in FIG. 8, loop 92 (FIG. 7) may be implemented using conductive regions 70 and the conductive portions of region 68 that run along edge 76 of opening 72. Antenna 40 of FIG. 8 may be fed using positive antenna feed terminal 58 and ground antenna feed terminal 54. Terminals 54 and 58 may be located in the vicinity of gap 18 to reduce electric field concentrations in gap 18 and thereby reduce the sensitivity of antenna 40 to touch events.

Figure 9:
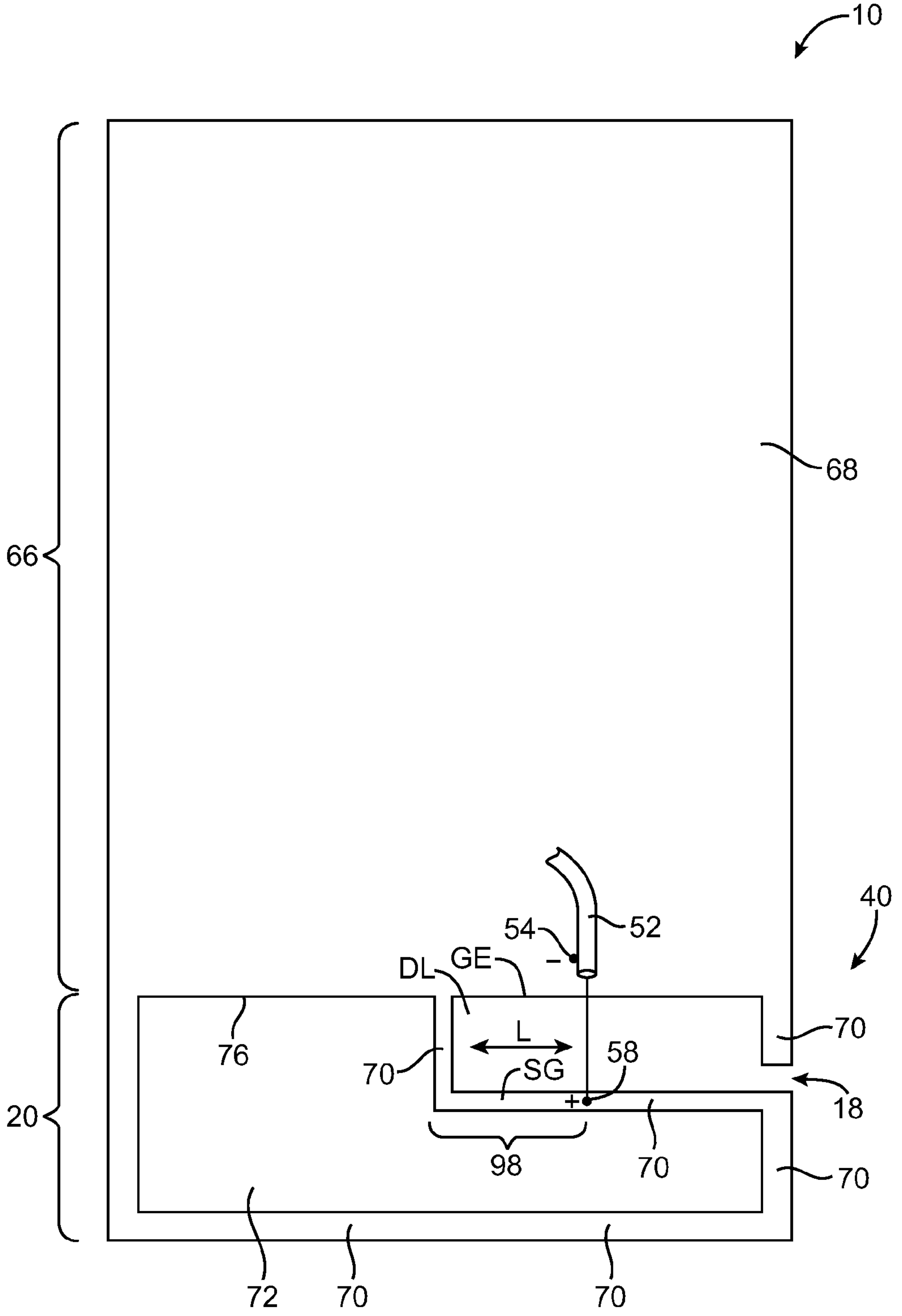
FIG. 9 is a diagram of an illustrative parallel-fed loop antenna having an inductive transmission line structure in accordance with an embodiment of the present invention.

The presence of inductor 98 may at least partly help match the impedance of transmission line 52 to antenna 40. If desired, inductor 98 may be formed using a discrete component such as a surface mount technology (SMT) inductor. The inductance of inductor 98 may also be implemented using an arrangement of the type shown in FIG. 9. With the configuration of FIG. 9, the loop conductor of parallel-fed loop antenna 40 may have an inductive segment SG that runs parallel to ground plane edge GE. Segment SG may be, for example, a conductive trace on a printed circuit board or other conductive member. A dielectric opening DL (e.g., an air-filled or plastic-filled opening) may separate edge portion GE of ground 68 from segment SG of conductive loop portion 70. Segment SG may have a length L. Segment SG and associated ground GE form a transmission line with an associated inductance (i.e., segment SG and ground GE form inductor 98). The inductance of inductor 98 is connected in parallel with feed terminals 54 and 58 and therefore forms a parallel inductive tuning element of the type shown in FIG. 8. Because inductive element 98 of FIG. 9 is formed using a transmission line structure, inductive element 98 of FIG. 9 may introduce fewer losses into antenna 40 than arrangements in which a discrete inductor is used to bridge the feed terminals. For example, transmission-line inductive element 98 may preserve high-band performance (illustrated as satisfactory resonant peak 94 of FIG. 6), whereas a discrete inductor might reduce high-band performance.

Figure 10:
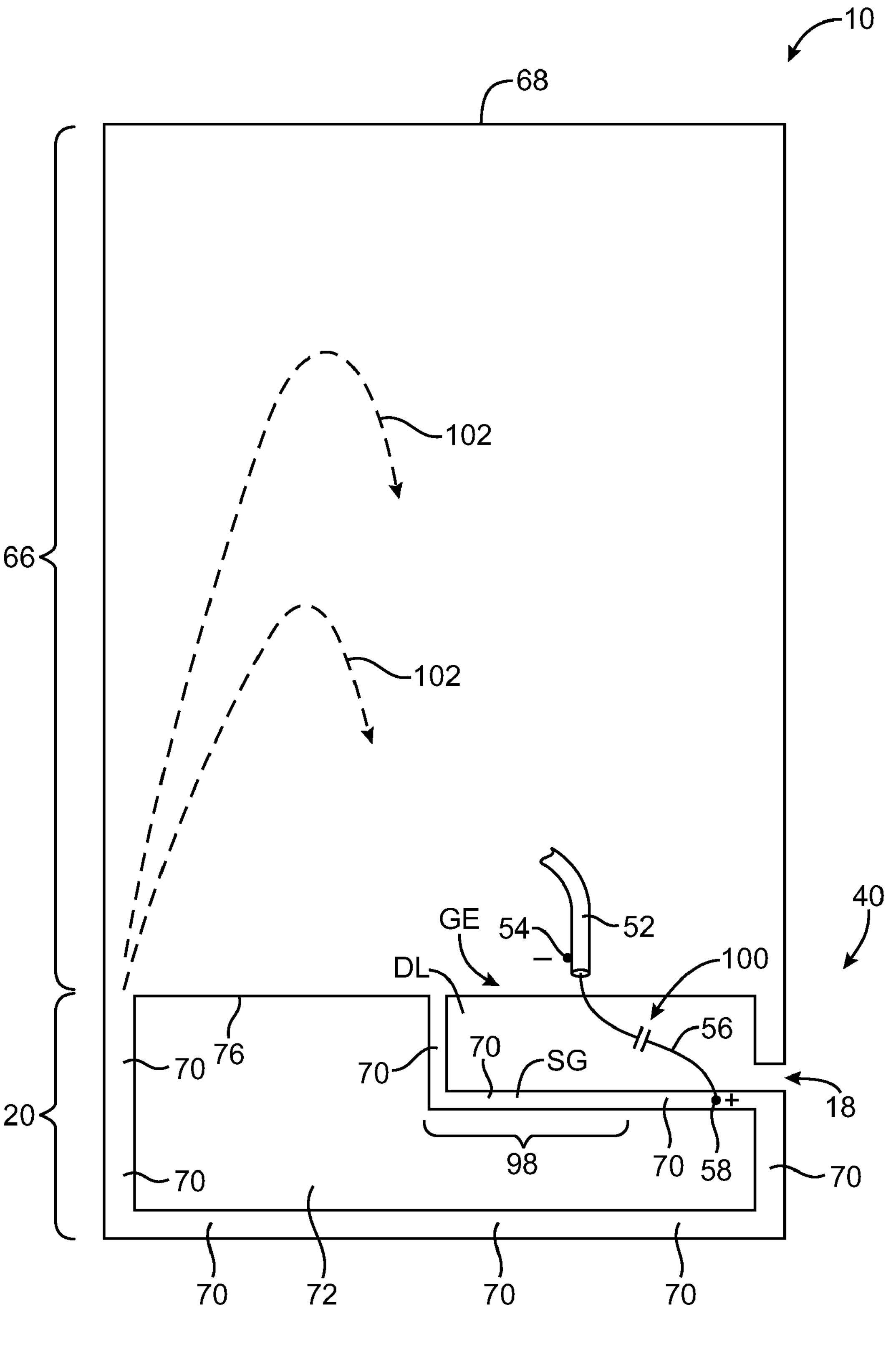
FIG. 10 is a diagram of an illustrative parallel-fed loop antenna with an inductive transmission line structure and a series-connected capacitive element in accordance with an embodiment of the present invention.

Capacitive tuning may also be used to improve impedance matching for antenna 40. For example, capacitor 100 of FIG. 10 may be connected in series with center conductor 56 of coaxial cable 52 or other suitable arrangements can be used to introduce a series capacitance into the antenna feed. As shown in FIG. 10, capacitor 100 may be interposed in coaxial cable center conductor 56 or other conductive structures that are interposed between the end of transmission line 52 and positive antenna feed terminal 58. Capacitor 100 may be formed by one or more discrete components (e.g., SMT components), by one or more capacitive structures (e.g., overlapping printed circuit board traces that are separated by a dielectric, etc.), lateral gaps between conductive traces on printed circuit boards or other substrates, etc.

The conductive loop for loop antenna 40 of FIG. 10 is formed by conductive structures 70 and the conductive portions of ground conductive structures 66 along edge 76. Loop currents can also pass through other portions of ground plane 68, as illustrated by current paths 102. Positive antenna feed terminal 58 is connected to one end of the loop path and ground antenna feed terminal 54 is connected to the other end of the loop path. Inductor 98 bridges terminals 54 and 58 of antenna 40 of FIG. 10, so antenna 40 forms a parallel-fed loop antenna with a bridging inductance (and a series capacitance from capacitor 100).

During operation of antenna 40, a variety of current paths 102 of different lengths may be formed through ground plane 68. This may help to broaden the frequency response of antenna 40 in bands of interest. The presence of tuning elements such as parallel inductance 98 and series capacitance 100 may help to form an efficient impedance matching circuit for antenna 40 that allows antenna 40 to operate efficiently at both high and low bands (e.g., so that antenna 40 exhibits high-band resonance peak 94 of FIG. 6 and low-band resonance peak 92 of FIG. 6).

Figure 11:
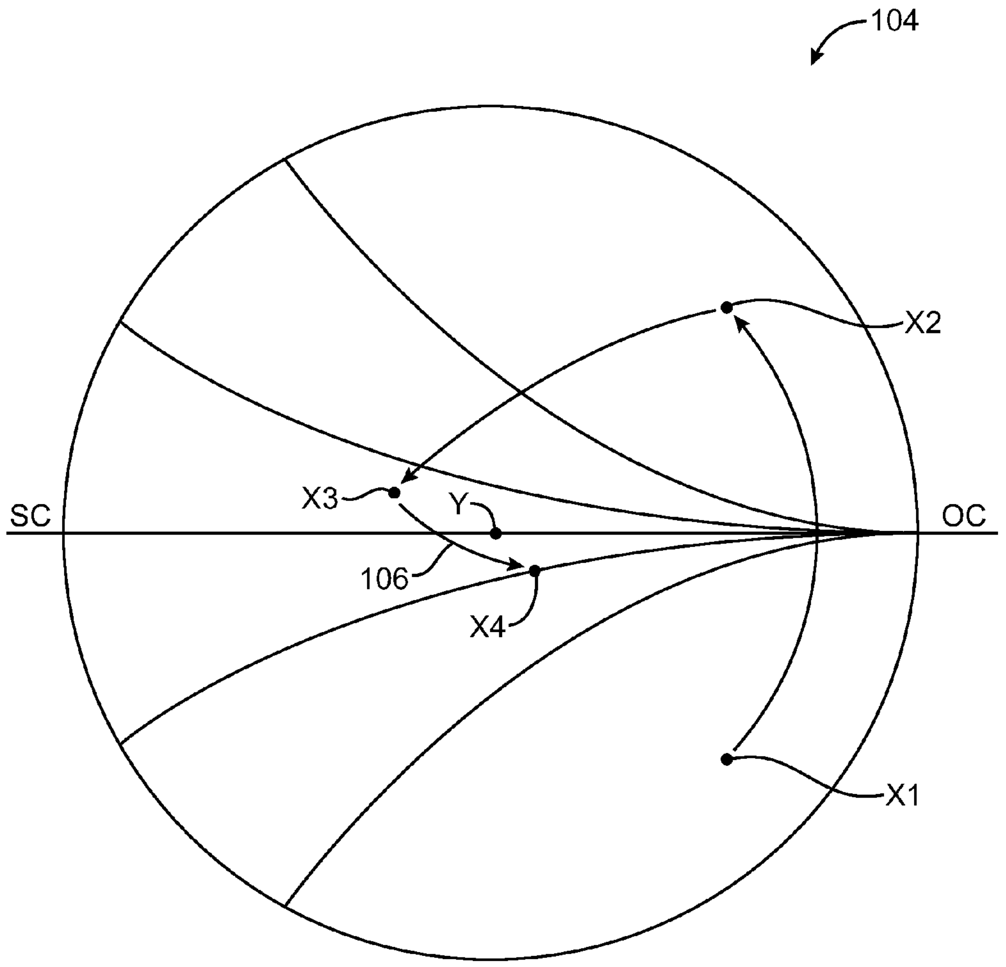
FIG. 11 is a Smith chart illustrating the performance of various electronic device loop antennas in accordance with embodiments of the present invention.

A simplified Smith chart showing the possible impact of tuning elements such as inductor 98 and capacitor 100 of FIG. 10 on parallel-fed loop antenna 40 is shown in FIG. 11. Point Y in the center of chart 104 represents the impedance of transmission line 52 (e.g., a 50 ohm coaxial cable impedance to which antenna 40 is to be matched). Configurations in which the impedance of antenna 40 is close to point Y in both the low and high bands will exhibit satisfactory operation.

With parallel-fed antenna 40 of FIG. 10, high-band matching is relatively insensitive to the presence or absence of inductive element 98 and capacitor 100. However, these components may significantly affect low band impedance. Consider, as an example, an antenna configuration without either inductor 98 or capacitor 100 (i.e., a parallel-fed loop antenna of the type shown in FIG. 4). In this type of configuration, the low band (e.g., the band at frequency f1 of FIG. 6) may be characterized by an impedance represented by point X1 on chart 104. When an inductor such as parallel inductance 98 of FIG. 9 is added to the antenna, the impedance of the antenna in the low band may be characterized by point X2 of chart 104. When a capacitor such as capacitor 100 is added to the antenna, the antenna may be configured as shown in FIG. 10. In this type of configuration, the impedance of the antenna 40 may be characterized by point X3 of chart 104.

At point X3, antenna 40 is well matched to the impedance of cable 50 in both the high band (frequencies centered about frequency f2 in FIG. 6) and the low band (frequencies centered about frequency f1 in FIG. 6). This may allow antenna 40 to support desired communications bands of interest. For example, this matching arrangement may allow antennas such as antenna 40 of FIG. 10 to operate in bands such as the communications bands at 850 MHz and 900 MHz (collectively forming the low band region at frequency f1) and the communications bands at 1800 MHz, 1900 MHz, and 2100 MHz (collectively forming the high band region at frequency f2).

Moreover, the placement of point X3 helps ensure that detuning due to touch events is minimized. When a user touches housing 12 of device 10 in the vicinity of antenna 40 or when other external objects are brought into close proximity with antenna 40, these external objects affect the impedance of the antenna. In particular, these external objects may tend to introduce a capacitive impedance contribution to the antenna impedance. The impact of this type of contribution to the antenna impedance tends to move the impedance of the antenna from point X3 to point X4, as illustrated by line 106 of chart 104 in FIG. 11. Because of the original location of point X3, point X4 is not too far from optimum point Y. As a result, antenna 40 may exhibit satisfactory operation under a variety of conditions (e.g., when device 10 is being touched, when device 10 is not being touched, etc.).

Although the diagram of FIG. 11 represents impedances as points for various antenna configurations, the antenna impedances are typically represented by a collection of points (e.g., a curved line segment on chart 104) due to the frequency dependence of antenna impedance. The overall behavior of chart 104 is, however, representative of the behavior of the antenna at the frequencies of interest. The use of curved line segments to represent frequency-dependent antenna impedances has been omitted from FIG. 11 to avoid over-complicating the drawing.

The foregoing is merely illustrative of the principles of this invention and various modifications can be made by those skilled in the art without departing from the scope and spirit of the invention.

What is claimed is:

1. A parallel-fed loop antenna in an electronic device having a periphery, comprising:
- a conductive loop path formed at least partly from conductive structures disposed along the periphery;
- an inductor interposed in the conductive loop path; and
- first and second antenna feed terminals that are bridged by the inductor, wherein the conductive structures of the conductive loop path are formed at least partly from a conductive bezel that surrounds the periphery of the electronic device.

2. The parallel-fed loop antenna defined in claim 1 wherein the conductive bezel comprises a gap.

3. The parallel-fed loop antenna defined in claim 2 wherein the first and second antenna feed terminals are located on opposing sides of the gap.

4. A parallel-fed loop antenna in an electronic device having a periphery, comprising:
- a conductive loop path formed at least partly from conductive structures disposed along the periphery;
- an inductor interposed in the conductive loop path;
- first and second antenna feed terminals that are bridged by the inductor;
- an antenna feed line that carries antenna signals between a transmission line and the first antenna feed terminal; and
- a capacitor interposed in the antenna feed line.

5. The parallel-fed loop antenna defined in claim 1 wherein the inductor comprises inductive transmission line structures.

6. A parallel-fed loop antenna in an electronic device having a periphery, comprising:
- a conductive loop path formed at least partly from conductive structures disposed along the periphery;
- an inductor interposed in the conductive loop path; and
- first and second antenna feed terminals that are bridged by the inductor, wherein the inductor comprises inductive transmission line structures, wherein the inductive transmission line structures comprise a first conductive structure formed from a portion of a ground plane and a second conductive structure that runs parallel to the first conductive structure, and wherein the first and second conductive structures are separated by an opening.

7. An electronic device, comprising:
- a housing having a periphery;
- a conductive structure that runs along the periphery and that has at least one gap on the periphery;
- an antenna formed at least partly from the conductive structure;
- a display, wherein the conductive structure comprises a bezel for the display;
- first and second antenna feed terminals for the antenna, wherein the antenna comprises a parallel-fed loop antenna;
- a substantially rectangular ground plane, wherein a portion of the loop antenna is formed from the substantially rectangular ground plane and wherein the second antenna feed terminal is connected to the substantially rectangular ground plane;
- radio-frequency transceiver circuitry;
- a transmission line having positive and ground conductors, wherein the transmission line is coupled between the radio-frequency transceiver circuitry and the first and second antenna feed terminals; and
- a capacitor interposed in the positive conductor of the transmission line.

8. The electronic device defined in claim 7 further comprising an inductor that bridges the first and second antenna feed terminals.

9. The electronic device defined in claim 7 wherein the second antenna feed terminal is connected to the substantially rectangular ground plane and wherein the first antenna feed terminal is electrically connected to the bezel.

10. Wireless circuitry, comprising:
- a ground plane;
- a conductive electronic device bezel having a gap;
- a solid dielectric that fills the gap;
- first and second antenna feed terminals, wherein the ground plane, bezel, and first and second antenna feed terminals form a parallel-fed loop antenna; and
- an inductive element, wherein the inductive element bridges the first and second antenna feed terminals.

11. The wireless circuitry defined in claim 10 further comprising:
- radio-frequency transceiver circuitry that is coupled to the parallel-fed loop antenna and that is configured to operate in at least first and second communications bands.

12. The wireless circuitry defined in claim 10 further comprising:
- radio-frequency transceiver circuitry that is coupled to the parallel-fed loop antenna and that is configured to operate in a first communications band that covers sub-bands at 850 MHz and 900 MHz and a second communications band that covers sub-bands at 1800 MHz, 1900 MHz, and 2100 MHz.

13. The wireless circuitry defined in claim 12 further comprising a capacitive element coupled in series with the first antenna feed terminal, wherein the second antenna feed terminal is connected to the ground plane.

14. An electronic device, comprising:
- a display having a rectangular periphery;
- radio-frequency transceiver circuitry;

a conductive structure that surrounds the rectangular periphery of the display and that has a gap along the periphery;

an antenna that includes a portion of the conductive structure that has the gap and that includes antenna feed terminals; and a transmission line coupled between the radio-frequency transceiver circuitry and the antenna feed terminals.

15. The electronic device defined in claim 14 further comprising a solid dielectric in the gap.

16. The electronic device defined in claim 14 further comprising an inductive element that bridges the antenna feed terminals.

17. The electronic device defined in claim 16 wherein the conductive structure comprises a bezel for the display.

18. The electronic device defined in claim 16 wherein the inductive element comprises portions of a ground plane and a conductive member that are separated by an opening.

19. The electronic device defined in claim 14 further comprising a capacitive element connected to a first antenna feed terminal of the antenna feed terminals.

20. The electronic device defined in claim 19 wherein the transmission line comprises a positive conductor and wherein the capacitive element is connected in series between the positive conductor and the first antenna feed terminal.

21. The electronic device defined in claim 20 wherein the conductive structure comprises a bezel for the display.

22. The electronic device defined in claim 14 further comprising:

a printed circuit board on which components are mounted, wherein the printed circuit board and components form at least part of a ground plane and wherein the antenna is formed at least partly from the ground plane.

23. The electronic device defined in claim 22 wherein a second antenna feed terminal of the antenna feed terminals comprises a ground antenna feed terminal that is connected to the ground plane.

* * * * *